United States Patent [19]

Saitoh et al.

[11] 4,046,677

[45] Sept. 6, 1977

[54] METHOD FOR SEPARATING LARGE-SIZED FILM-LIKE PLASTICS

[75] Inventors: Kozo Saitoh, Tokyo; Hiroshi Tanaka, Chofu; Tatsuya Nagahama, Tokyo; Sumio Izumi, Kokubunji, all of Japan

[73] Assignee: Mitsui Mining & Smelting Co., Ltd., Nihonbashi, Japan

[21] Appl. No.: 469,925

[22] Filed: May 14, 1974

[30] Foreign Application Priority Data

July 21, 1973 Japan .................. 48-81880

[51] Int. Cl.² ........................... B03D 1/02
[52] U.S. Cl. ............................ 209/166
[58] Field of Search ................ 209/162–166, 209/173, 2, 3; 241/14, 20

[56] References Cited

U.S. PATENT DOCUMENTS

| | | | |
|---|---|---|---|
| 787,518 | 4/1905 | Lawrence | 241/20 |
| 2,378,152 | 8/1942 | Nagelvoort | 209/2 |
| 2,389,958 | 11/1945 | Crawford | 210/54 X |
| 2,410,633 | 11/1946 | Counselman | 209/165 X |
| 2,606,660 | 8/1952 | Klepetko | 209/162 |
| 3,074,653 | 1/1963 | Schorsch | 241/14 |
| 3,224,582 | 12/1965 | Iannicelli | 209/166 |
| 3,240,556 | 3/1966 | Bhappu | 209/166 X |
| 3,284,282 | 11/1966 | Immel | 209/3 X |
| 3,479,281 | 11/1969 | Kindai | 209/164 X |
| 3,925,200 | 12/1975 | Izumi et al. | 209/166 X |
| 3,926,790 | 12/1975 | Izumi | 209/166 |

Primary Examiner—Robert Halper
Attorney, Agent, or Firm—Sughrue, Rothwell, Mion, Zinn and Macpeak

[57] ABSTRACT

A method for separating large-sized film-like plastics, such as polypropylene or polyvinyl chloride, which comprises placing the plastics in a separation tank containing an aqueous liquid medium and introducing gas bubbles into the tank thereby to cause the gas bubbles to adhere to the surface of the plastics. The buoyancy of the gas bubbles causes the plastics to rise to the medium surface. Addition of a flotation agent and/or a wetting agent further promotes the floating of the plastics.

9 Claims, No Drawings

METHOD FOR SEPARATING LARGE-SIZED FILM-LIKE PLASTICS

BACKGROUND OF THE INVENTION

1. Field of the Invention

This invention relates to a method of separating large-sized film-like plastics.

2. Description of the Prior Art

The quantities of film-like plastics in industrial and household wastes have recently been increasing, but no effective method for treating these waste plastics has been established. Only incineration and the melt-remolding method are in current use. Incineration, however, is not a desirable method because polyvinyl chloride contained in the plastics can cause secondary pollution due to evolution of harmful gases or harmful metal oxides.

Methods have been described for separating and recovering polyvinyl chloride from mixed plastics using flotation as disclosed in copending U.S. Patent Applications Ser. No. 443,937, filed Feb. 19, 1974, Ser. No. 443,936, filed Feb. 19, 1974 and Ser. No. 443,574, filed Feb. 19, 1974. The methods described in these applications are directed to the treatment of mixtures of granular plastics of a relatively small size using flotation. Since flotation is a process whereby particles are raised to the water surface due to the buoyancy of fine gas bubbles adhering to the particles, the method is directed to and was developed for particles of a relatively small particle sizes. With ores, fine powders with a particle size of less than about 0.3 mm can usually be treated using this method, and on very rare occasions, particles of less than several millimeters can be floated. However, it is impossible to raise larger particles using the buoyancy of gas bubbles.

The inventors made a number of studies on the flotation characteristics of plastics, and found that the manner of adhesion of the gas bubbles differs depending on the surface characteristics of film-like plastics in the water, and where adhesion of a large number of gas bubbles to the surfaces can be achieved, even large-sized film-like plastics can be easily raised and floated on the water surface. Films such as polyvinyl chloride or polystyrene films having a specific gravity larger than 1 sink to the bottom in a tank containing water. When a number of small gas bubbles are introduced into the tank, these small gas bubbles begin to adhere to the surface of the films and the number of gas bubbles so adhered gradually increases. Eventually, the total buoyancy of the gas bubbles surpasses the gravity of the films, and the film rise in the water and float on the surface of the water in such a manner that their maximum surface area is substantially aligned with the surface of the liquid medium. Films having a specific gravity of less than 1, such as polypropylene or polyethylene films, gradually rise in the water and reach the water surface even when no specific measure is taken. However, when gas bubbles adhere to such films, the rate at which the films rise greatly increases, and such films rise to the water surface at a speed about 5 to 10 times as fast as that attained in the absence of the buoyancy effect generated by the gas bubbles thus making it possible to drastically shorten the time required for separation. If the separating time is so shortened, large quantities of material can be treated in a small-scale apparatus.

SUMMARY OF THE INVENTION

It is therefore an object of this invention to provide a method for separating large-sized film-like plastics in water by utilizing the buoyancy of gas bubbles adhering thereto.

Accordingly, this invention provides a method for separating large-sized film-like plastics which comprises introducing gas bubbles into a dispersion of the plastics in an aqueous liquid medium to adhere them to the film-like plastics whereby the film-like plastics are floated and separated.

DETAILED DESCRIPTION OF THE INVENTION

The present invention is carried out in an aqueous liquid medium which includes water or salt water. Suitable examples of salt water include sea water, brine, bittern-containing water as well as aqueous solutions containing halides such as NaCl, $MgCl_2$ and $MgBr_2$, etc., sulfates such as $MgSO_4$, $CaSO_4$, $K_2SO_4$ and $Na_2SO_4$, etc. and bicarbonates such as $Ca(HCO_3)_2$ and $NaHCO_3$, etc. Water generally is employed as the aqueous liquid medium.

The gas bubbles employed in this invention can be generated in a separation tank using any known method, such as mechanical stirring, bubbling a gas through the medium, release of gases dissolved under pressure, vacuum evacuation to release dissolved gases or electrolysis, etc. Where desired a combinations of two or more of these methods can be employed. Suitable examples of gases which can be used include air, oxygen, nitrogen, carbon dioxide, inert gases such as argon, etc. Since the feed material is generally in the form of large-sized films (e.g., pieces whose sum of the longest length or diagonal and the shortest width divided by two ranges from about 10 to about 100 mm) and generally has a low true specific gravity (e.g., up to a specific gravity of about 1.4), it is not necessary to stir the water in the tank very strongly. The above set forth size range is not limiting and is only the range generally employed. Sizes outside this range can be suitably separated, where desired. The weight ratio of the medium and the film-like plastics is suitably such that the proportion of the film-like plastics is about 1 to 10, preferably 1 to 3, parts by weight per 100 parts by weight of the medium. If the proportion of the plastics is above 10 parts by weight, the films become entangled with each other, and the separating accuracy is lowered. If the proportion is less than 1 part by weight, the amount of the medium to be handled increases which is economically disadvantageous. The rate of stirring varies widely depending upon factors such as the size and shape of the flotation tank, the proportion of the liquid medium and plastics contained therein, the size and shape of the plastics, etc. Suitably, the stirring is maintained at such a rate that the settling of films of plastics having a specific gravity more than 1.0 (when the liquid medium is water at normal temperatures) is prevented. In other words, it is suitable if sufficient stirring is maintained to prevent the films from settling in a specific liquid medium. Unduly vigorous stirring should be avoided since it sometimes causes swirling which forces the floated films to sink.

The liquid medium temperature can suitably be about room temperature (about 20°–30° C), but if the medium is warmed, the floating and separating of the films can be facilitated. The temperature of the liquid medium is not critical in the method of this invention, but is preferably in the range of from about 0° to about 70° C, most preferably at an environment temperature (about 15° to about 35° C). Temperatures below about 0° C are practically not preferred since at such low temperatures the efficiency of separation of the plastics in the flotation tends to decrease. On the other hand, the use of a temperature higher than about 70° C makes the method of the present invention uneconomical and, in addition, such a higher temperature is not desirable from the standpoint of the working environment.

When a conventional frothing agent is added at the same time as the introduction of the small gas bubbles to float large-sized film-like plastics, the separating efficiency increases, and the time required for separation can be shortened. The flotation agent which can be used in the present invention includes a frothing agent and a collecting agent. These agents can be those commonly used in flotation in ore dressing techniques as described in A. F. Taggart, *Handbook of Mineral Dressing Ores and Industrial Minerals*, 1948, 12-06 to 12-18 and 12-42 to 12-47, John Wiley and Sons, Inc., New York. Examples of suitable frothing agents are pine oil, cresylic acid, eucalyptus oil, camphor oil, higher alcohols having 4 to 5 carbon atoms such as propyl alcohol, amyl alcohol, etc., methyl isobutyl carbinol, pyridine, ortho-toluidine or a mixture thereof. An example of a frothing agent which has been found to be particularly effective in the method of this invention is pine oil. Suitable examples of collecting agents are a fatty acid or a salt thereof, for example, oleic acid, stearic acid, palmitic acid and the like and an alkali metal salt thereof, most generally, oleic acid or sodium oleate. These flotation agents are generally added in an amount of from about 1 to 100 g per ton of the plastics.

In order to improve the separation of the film-like plastics, it is desirable to control the wettability of the film surfaces by water by using a wetting agent. The wettability is especially improved using sodium lignin sulfonate, calcium lignin sulfonate, and hydrophilic organic colloids. The term "organic colloid" used herein refers to hydrophilic organic colloids which render the surfaces of the large-sized film like plastics more hydrophilic than the plastics other than the above large-sized plastics thereby increasing the wetting characteristics of large-sized film like plastics. Such hydrophilic organic colloids are well known in the art in the field of ore processing as described in, for example, A. F. Taggart, *Handbook of Mineral Dressing Ores and Industrial Minerals*, 1948, 12-33 to 12-34, John Wiley and Sons, Inc., New York. Suitable examples of the hydrophilic organic colloid which can be used in the present invention are tannic acid, a quebracho extract, gelatin, glue, saponin and the like. These hydrophilic organic colloids can be used alone as a mixture of two or more colloids. A suitable amount of the wetting agent is about 1 to 50 g per ton of the starting material, but the amount to some extent is determined by the type of plastics to be treated.

Examples of the plastics that can be treated by this invention are polypropylene, polyethylene, polystyrene, soft polyvinyl chloride, hard polyvinyl chloride, a polyamide, a polyacrylate, a phenolic and melamine.

The term "film-like", as used in this specification and appended claims, denotes, for example, a plastic material in the form of a thin film, sheet, film, leather-like, laminate or plate. A suitable thickness generally is less than about 1 mm. Since the plastic floating on the medium surface assumes a planar form, the size of the film which can be treated using the method of this invention, although differing according to the area of the medium surface in the separating tank, is about 40 to 70 mm with a liquid surface area of, for example, in a batch type separating tank having a cross sectional area of 120 × 120 mm. Since the film-like plastics are floated successively, they form multilayers on the medium surface. In order not to obstruct subsequent flotations, the floated plastics should desirably be removed from the separating tank, e.g., by scraping the surface.

The process of this invention can be carried out either in a batch manner or a continuous manner. In the batch process, the time required for accomplishing the flotations varies depending upon the capacity and the shape of the flotation tank used, the quantity of the plastics subjected to flotation and the liquid medium, the size distribution of plastics, the presence or absence of additives such as a frothing agent, the amount of the additives, the temperature of the liquid medium, the proportion of the plastics and the liquid medium and the like, but generally is from several seconds to several minutes. When a frothing agent is present, the efficiency of the flotation can be increased by 1 to 5 times as compared with that of the flotation in the absence of such an agent.

Thus, the present invention provides a method of separating certain film-like plastics from other film-like plastics of different quality and characteristics within very short periods of time utilizing the wettability of the large-sized film-like plastics and the buoyancy of many gas bubbles in the medium. The operation is simple, the method is inexpensive and large quantities of material can be treated. Accordingly, the method of this invention is quite valuable as a method for separating mixtures containing large-sized film-like plastics previously considered to be waste materials thereby requiring methods of disposal.

The following Examples are given to illustrate the present invention in greater detail. Unless otherwise indicated, all parts, percents and the like are by weight.

EXAMPLE 1

30 Grams of a mixture of film-like polypropylene and thin plate-like hard polyvinyl chloride having a size of 30 to 60 mm was placed in a batch type separating tank having a capacity of 1,600 ml and containing water. Gas bubbles were introduced from the bottom of the tank and many gas bubbles adhered to the surface of the polypropylene. In about 20 seconds the polypropylene films floated on the surface of the water and thus could be separated from the thin plate-like hard polyvinyl chloride. When the above procedures were repeated with the exception that no gas bubbles were introduced, the rate at which the film like polypropylene rose toward the surface was very slow, and a period of more than 2 minutes was required until the polypropylene film reached the water surface.

When the above procedures were repeated using sea water instead of the water above, the same results were obtained.

EXAMPLE 2

50 Grams of a mixture of leather-like soft polyvinyl chloride and thin plate-like hard polyvinyl chloride having a size of 10 to 50 mm was placed in the same apparatus as described in Example 1, and gas bubbles were introduced from the bottom of the tank. When the mixture of water and the two types of polyvinyl chloride was gently stirred, the soft polyvinyl chloride tended to float. When the above procedures were repeated and 10 g of tannic acid as a wetting agent and 5 g of pine oil as a frothing agent were added per ton of the mixture, only the soft polyvinyl chloride was floated and separation of the mixture into the two types of polyvinyl chloride was substantially complete.

When the above procedures were repeated using a 5% aqueous solution of $Na_2SO_4$ instead of the water, the same results were obtained.

EXAMPLE 3

300 Grams of a mixture of film-like soft polyvinyl chloride and film-like polyethylene having a size of 50 to 100 mm was placed in a batch type separation tank containing water and having a capacity of 8,000 ml. Gas bubbles were introduced from the bottom of the tank, and when the water was gently stirred, a greater part of the polyethylene and a part of the polyvinyl chloride rose to the water surface.

The same procedures as described above were successively repeated three times using as starting materials in each successive separation the materials that rose to the water surface in the previous separation, and the floated material which was collected, consisted almost solely of polyethylene. When the above single stage procedures were repeated and 15 g of sodium lignin sulfonate as a wetting agent and 10 g of pine oil as a frothing agent were added per ton of the mixture, the separation was further promoted.

When the above single stage procedures were repeated and a 7% aqueous solution of NaCl was used instead of the water, the same results were obtained.

EXAMPLE 4

120 Grams of a mixture of 20 g of film-like polystyrene having a size of 20 to 50 mm and 100 g of irregular granules of hard polyvinyl chloride having a size of 1 to 8 mm was placed in the same apparatus as used in Example 1. Gas bubbles were introduced from the bottom of the tank, and the water was gently stirred. A number of gas bubbles adhered to the surface of the polystyrene, and in about 30 seconds, the film-like polystyrene rose to the water surface and could be separated from the granular hard polyvinyl chloride. When 2 g of pine oil as a frothing agent was added per ton of the film-like polystyrene and the above described procedures were repeated, the floating and separation of the polystyrene were further promoted.

While the invention has been described in detail and with reference to specific embodiments thereof, it will be apparent to one skilled in the art that various changes and modifications can be made therein without departing from the spirit and scope thereof.

What is claimed is:

1. A method for separating plastic film-like particles of differing wettability, said particles having a size of from about 10 to about 100 mm, which comprises introducing gas bubbles into a dispersion of said particles in an aqueous liquid medium; causing greater members of gas bubbles to adhere to the surfaces of the less wettable particles thereby substantially selectively floating said less wettable particles to the surface of the liquid medium; said plastics being selected from the group consisting of polypropylene, polystyrene, soft polyvinyl chloride, hard polyvinyl chloride, a polyamide, a polyacrylate, a phenolic and a melamine.

2. The method of claim 1, wherein the proportion of the film-like plastics is about 1 to 10 parts by weight per 100 parts by weight of said aqueous liquid medium.

3. The method of claim 1, wherein said aqueous liquid medium includes a flotation agent and a wetting agent.

4. The method of claim 3, wherein said flotation agent is a frothing agent, a collecting agent or a mixture thereof.

5. The method of claim 3, wherein the amount of said wetting agent is about 1 to 50 g per ton of said plastics.

6. The method of claim 3, wherein said wetting agent is sodium lignin sulfonate, calcium lignin sulfonate, a hydrophilic organic colloid or a mixture thereof.

7. The method of claim 1, wherein said aqueous liquid medium is warmed.

8. The method of claim 1, wherein said aqueous liquid medium is water or salt water.

9. The method of claim 8, wherein said salt water is sea water or brine.

* * * * *